US012107695B2

(12) United States Patent
Banerjee et al.

(10) Patent No.: US 12,107,695 B2
(45) Date of Patent: *Oct. 1, 2024

(54) MULTICAST ROUTING

(71) Applicant: Cisco Technology, Inc., San Jose, CA (US)

(72) Inventors: Ayan Banerjee, Fremont, CA (US); Raghava K. Sivaramu, Fremont, CA (US); Srinivasan Ramabadran, Sunnyvale, CA (US); Mehak Mahajan, Santa Clara, CA (US); Nataraj Batchu, Sunnyvale, CA (US)

(73) Assignee: Cisco Technology, San Jose, CA (US)

( * ) Notice: Subject to any disclaimer, the term of this patent is extended or adjusted under 35 U.S.C. 154(b) by 401 days.

This patent is subject to a terminal disclaimer.

(21) Appl. No.: 17/465,822

(22) Filed: Sep. 2, 2021

(65) Prior Publication Data

US 2021/0399908 A1 Dec. 23, 2021

Related U.S. Application Data

(63) Continuation of application No. 16/372,148, filed on Apr. 1, 2019, now Pat. No. 11,133,947, which is a continuation of application No. 14/734,987, filed on Jun. 9, 2015, now Pat. No. 10,250,399.

(60) Provisional application No. 62/059,616, filed on Oct. 3, 2014.

(51) Int. Cl.
*H04L 12/18* (2006.01)
*H04L 45/16* (2022.01)
*H04L 45/745* (2022.01)
*H04L 49/201* (2022.01)

(52) U.S. Cl.
CPC .............. *H04L 12/18* (2013.01); *H04L 45/16* (2013.01); *H04L 45/745* (2013.01); *H04L 49/201* (2013.01)

(58) Field of Classification Search
CPC ....... H04L 12/18; H04L 45/16; H04L 45/745; H04L 49/201
See application file for complete search history.

(56) References Cited

U.S. PATENT DOCUMENTS

| | | |
|---|---|---|
| 7,068,666 B2 | 6/2006 | Foster et al. |
| 2002/0126671 A1 | 9/2002 | Ellis et al. |
| 2008/0016191 A1 | 1/2008 | Bijwaard |

(Continued)

OTHER PUBLICATIONS

Tian et al., "DOM: A Scalable Multicast Protocol for Next-Generation Internet," IEEE Network, Jul./Aug. 2010, 7 pages; http://bbcr.uwaterloo.ca/-xshen/paper/2010/dasmpf.pdf.

(Continued)

*Primary Examiner* — Rhonda L Murphy
(74) *Attorney, Agent, or Firm* — Polsinelli P.C.

(57) ABSTRACT

In accordance with one example embodiment, a system configured for programming a network layer multicast address entry in a routing table of an ingress line card module is disclosed. The network layer multicast address entry includes a network layer address associated with at least one egress line card. The system is further configured for programming a data link layer multicast routing address entry in a routing table of a fabric card module in which the data link layer multicast routing address entry corresponds to the network layer multicast address entry.

20 Claims, 6 Drawing Sheets

(56) References Cited

U.S. PATENT DOCUMENTS

| | | | |
|---|---|---|---|
| 2011/0064078 A1* | 3/2011 | Jain | H04L 12/1886 370/390 |
| 2011/0225207 A1 | 9/2011 | Subramanian | |
| 2012/0014386 A1 | 1/2012 | Kiong | |
| 2014/0376404 A1 | 12/2014 | Bryskin | |
| 2015/0124684 A1 | 5/2015 | Banerjee et al. | |
| 2015/0256405 A1 | 9/2015 | Janardhanan | |

OTHER PUBLICATIONS

Cisco Systems, Inc., "Cisco Nexus 9500 Series Switches Architecture," White Paper, Nov. 2013, 17 pages.

\* cited by examiner

FIG. 6

MULTICAST ROUTING

CROSS-REFERENCE TO RELATED APPLICATIONS

This application is a Continuation of U.S. application Ser. No. 16/372,148 entitled Multicast Routing, filed on Apr. 1, 2019, which in turn is a Continuation of U.S. application Ser. No. 14/734,987 entitled Multicast Routing, filed on Jun. 9, 2015, which in turn, claims the benefit of priority to U.S. Provisional Application No. 62/059,616, filed Oct. 3, 2014, both of which are hereby incorporated by reference in their entirety.

TECHNICAL FIELD

This disclosure relates in general to the field of computer networking and, more particularly, to systems, methods, and computer readable mediums for multicast packet forwarding in a network element comprising a plurality of line cards and at least one fabric module.

BACKGROUND

Multicasting allows one-to-many communication over a network to allow a source to distribute information, such as video content, to a group of receivers simultaneously. Each receiver typically sends a join message in order to join a multicast group to enable each receiver to receive the information broadcast by the source. Typically, the source and receivers are connected together through one or more network elements, e.g. switches, at a datacenter. Typically, such a network element will often include a modular switch chassis having one or more modular line cards installed therein. Each line card includes a number of transmitting/receiving ports to allow communication between network devices coupled to the switch. Typically, when a modular switch chassis receives a request to join a group, the modular switch chassis programs a routing entry specifying the source, mulitcast group, and identifying a set of outgoing interfaces. Generally, multicast entries are programmed uniformly across all forwarding instances. Each multicast route entry maintains a list of outgoing interfaces (OIF List) to which an incoming multicast data packet matching the route is replicated. In hardware-forwarded route entries, these OIF lists are stored inside the hardware in replication tables which are limited in size. On a typical modular switch chassis, whenever the control plane protocol receives a group request, source join, etc. associated with a multicast broadcast, the modular switch chassis programs the routing entries to a set of outgoing interface lists (OIFs) symmetrically across all line cards. As a result, the scalability limit of a switching node is limited to the scale of each forwarding instance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

One aspect of the present disclosure provides a method for multicast packet forwarding in a network element comprising a plurality of line cards and at least one fabric module, where the at least one fabric module is communicatively coupled with each line card. The method includes steps of receiving an identification of a multicast route and identifying, from the plurality of line cards, an ingress line card and one or more egress line cards for the received multicast route. The method also includes a step of programming a network layer multicast route entry for a multicast route in a routing table on a sub-set of the plurality of line cards, the sub-set comprising the ingress line card and the one or more egress line cards. The network layer multicast route entry includes one or more network layer addresses associated with one or more identified egress line cards. By programming the network layer multicast route entry on only a sub-set of the plurality of line cards (hence, the "asymmetric programming"), preferably only on the ingress and egress line cards for the multicast route, the number of programming entries is minimized, allowing better scalability. The method further includes a step of programming a data link layer multicast route entry for the multicast route in a routing table on the at least one fabric module. In other words, for each network layer multicast route entry programmed on the sub-set of the line cards, a corresponding data link layer multicast route entry is programmed on the at least one fabric module (if there are plurality of such modules, then possibly on all fabric modules). Programming the data link layer multicast route entries on the fabric modules enables the fabric modules to perform an additional data link layer lookup, further scaling the routing capabilities of the network element to higher numbers with effective bandwidth utilization within the network element.

In an embodiment, the network layer multicast route entry includes a Layer 3 address, such as e.g. an Internet Protocol (IP) address, of the one or more egress cards for the multicast route, while the data link layer multicast route entry includes a Layer 2 address, such as e.g. a Media Access Control (MAC) address, of the one or more egress cards for the multicast route.

Asymmetrically programming network layer multicast address route entries only on ingress and egress line cards while symmetrically programming data link layer multicast address route entries on all fabric modules of a network element allows performing hierarchical multicast routing where lookups are performed and multicast packets are forwarded in stages, advantageously providing savings in both processing resources and bandwidth within the network node. When a multicast packet is received at an ingress line card, in a first stage, a lookup of the programmed network layer multicast address route entry is performed at the ingress line card that received the multicast packet to resolve local receivers, i.e. to determine whether there are any multicast receivers that are attached to the ingress card. If there are such receivers, the multicast packet may be promptly (e.g. directly) transmitted to those receivers from the ingress card, via the egress ports of the ingress card corresponding/assigned to the attached receivers. As a result of performing this lookup, the step of forwarding the multicast packet to the fabric modules may be eliminated/avoided (if the lookup yields that all receivers are local), thus advantageously saving bandwidth within the network element (e.g. saving intra-chassis bandwidth). In a second stage, a lookup of the programmed data link layer multicast address route entry is performed at a fabric module that received a multicast packet forwarded by the ingress line card in order to determine one or more egress line cards. As a result of performing this lookup, the multicast packet is forwarded only to potential egress line cards ("potential" is due to possible MAC address aliasing, as explained below), thus further saving the bandwidth within the network element. In a third stage, a lookup of the programmed network layer multicast address route entry is performed at each line card that received the multicast packet from the fabric module. As a result of performing this lookup, the line card can determine whether it is the intended recipient of the forwarded multicast packet (i.e. whether the line card is indeed one of the egress line cards for this packet) and, if so, determine the egress ports for transmitting the multicast packet to the multicast receiver(s).

In an embodiment, the method may further include receiving a multicast packet for the multicast route at the ingress line card, forwarding the multicast packet from the ingress line card to the at least one fabric module, performing a lookup of the data link layer multicast route entry programmed for the multicast route at the at least one fabric module to identify the one or more egress line cards (this lookup is described in the following as a "second stage" lookup), forwarding the multicast packet from the at least one fabric module to the one or more egress line cards identified in the lookup of the data link layer multicast route entry, and performing a lookup of the network layer multicast route entry programmed for the multicast route at the sub-set of the plurality of line cards to identify one or more egress ports (this lookup is described in the following as a "third stage" lookup). The method may further include forwarding the multicast packet from the one or more egress ports of the one or more egress line cards to one or more multicast receivers. The method may also include performing what is described in the following as a "first stage" look up—upon receiving the multicast packet at the ingress line card, performing a lookup of the network layer multicast route entry programmed for the multicast route at the ingress line card to determine whether any multicast receivers are attached to the ingress line card. Upon positive determination, the method may include identifying one or more egress ports for the multicast packet at the ingress line card and forwarding the multicast packet from the ingress line card to one or more multicast receivers attached to the ingress line card.

In an embodiment, the method may further include receiving a first packet at an ingress line card, sending the first packet including the network layer multicast route entry to a fabric card module, aliasing the network layer multicast route entry with the data link layer multicast route entry, and sending the first packet to one or more of the at least one egress line card based upon the aliasing.

In an embodiment, the egress line card may be configured to determine whether the first packet is intended for the at least one egress line card. In one further embodiment, the egress line card may further be configured to drop the first packet if it is determined that the first packet is not intended for the egress line card and/or be further configuredd to forward the first packet to a port if it is determined that the first packet is intended for the egress line card.

Since embodiments of the methods described herein involve asymmetric programming of addresses in routing tables (i.e. multicast entries) of the line cards and fabric modules of a network element such as e.g. a modular switch chassis, a functional entity within the network element performing embodiments of these methods described herein will be referred to in the following as a "programming logic" of the network element.

As will be appreciated by one skilled in the art, aspects of the present disclosure, in particular the functionality of the programming logic described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing network elements such as the existing routers, switches, various control nodes, etc.) or be stored upon manufacturing of these devices and systems.

EXAMPLE EMBODIMENTS

Figure 1:
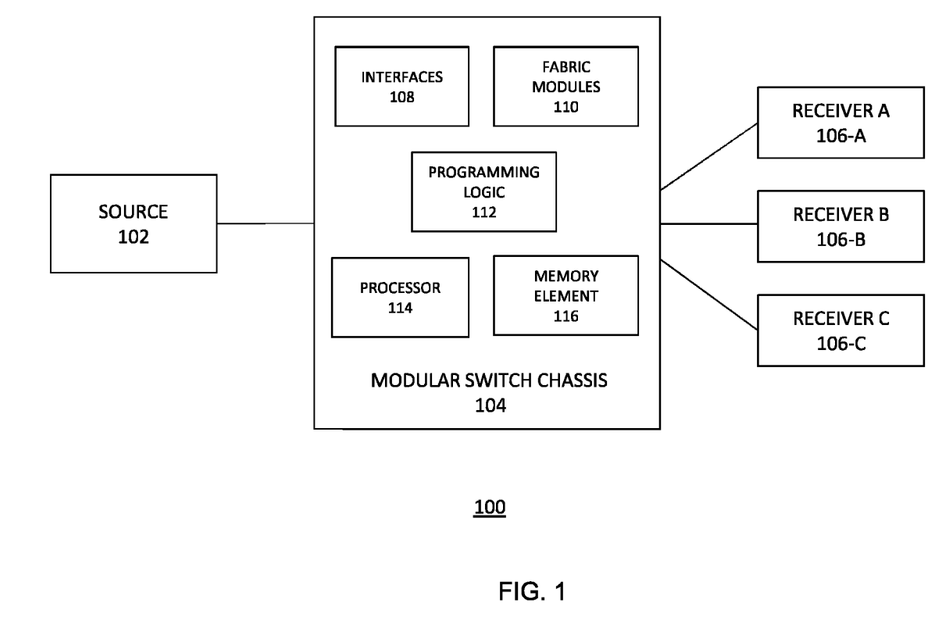
FIG. 1 is a simplified block diagram of a multicast communication system, according to some exemplary embodiments of the present disclosure.

FIG. 1 provides a simplified block diagram of a multicast communication system 100, according to some exemplary embodiments of the present disclosure. The system 100 includes a multicast source 102 in communication with a network element 104 which could be implemented as a modular switch chassis. The network element 104 is in further communication with receivers 106 shown as receiver A 106-A, receiver B 106-B, and receiver C 106-C. The source 102 is configured to provide a multicast data stream, such as e.g. a video data strem, to one or more of the receivers 106 that have joined the multicast group associated with the multicast data stream. For example, consider that receiver A and receiver B each sent a request to join the multicast group associated with the multicast data stream broadcast by the source 102. The source transmits the multicast data stream to the network element 104, and the network element 104 receives the multicast data stream via an ingress line card module installed within the network element. The network element 104 then transmits the muli-cast stream to each of receiver A and receiver B via one or more egress line card modules installed within the network element.

As shown in FIG. 1, the network element 104 may be considered to include interfaces 108, fabric card modules 110, and programming logic 112. The interfaces 108 are configured to receive and send multicast packets. The fabric card modules 110 are configured to provide high-speed data forwarding connectivity for the interfaces 108 within the network element 104. The programming logic 112 is configured to implement asymmetric programming of multicast entries and, optionally, 3-stage hierarchical lookup, as described herein. Further, a processor 114 and a memory element 116 may facilitate the various operations performed by any elements of the network element 104, in particular the operations performed by the programming logic 112.

The interfaces 108 are typically provided as interface cards (sometimes referred to as "line cards"). Generally, they control the sending and receiving of data packets over the network and sometimes support other peripherals used with the network element 104. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces may allow the master processor 114 to efficiently perform routing computations, network diagnostics, security functions, etc.

Figure 6:
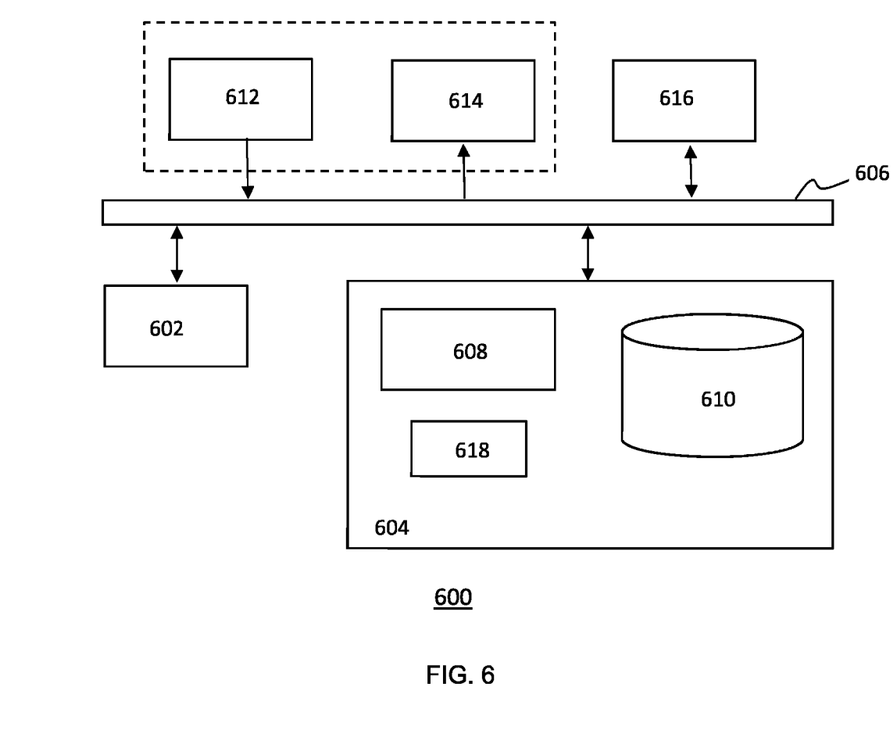
FIG. 6 illustrates a data processing system that may be used in a network element shown in FIG. 1, according to some exemplary embodiments of the present disclosure.

While the system 100 shown in FIG. 1 illustrates one source and three receivers, embodiments of the present invention are applicable to any number of sources and receivers. Further, although the network element 104 shown in FIG. 1 is one specific network element of the present disclosure, it is by no means the only network element architecture on which embodiments of the present disclosure can be implemented. For example, an architecture having a single processor that handles communications as well as routing computations, etc. may be often used. Further, other types of interfaces and media could also be used with the network element. Another example of a data processing system configured to implement the asymmetric programming functionality and/or 3-stage hierarchical lookup of the network element 104 is illustrated in FIG. 6.

Figure 2:
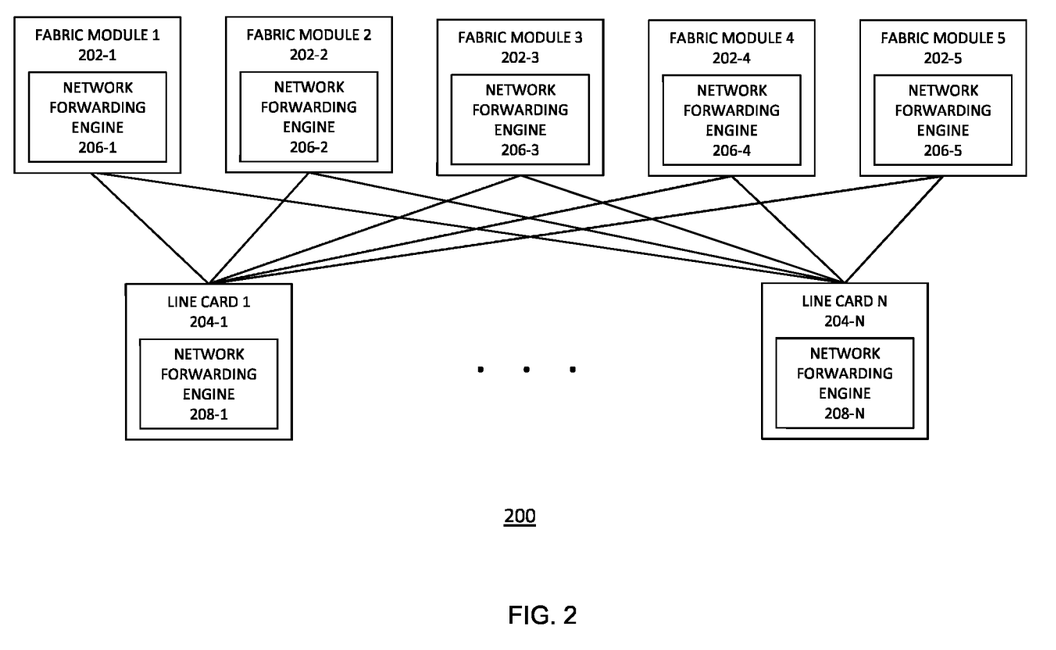
FIG. 2 is a simplified block diagram of a modular switch chassis, according to some exemplary embodiments of the present disclosure.

FIG. 2 is a simplified block diagram of a modular switch chassis 200, according to some exemplary embodiments of the present disclosure. The modular switch chassis 200 could serve as the network element 104 shown in FIG. 1 configured to implement asymmetric programming of multicast entries. In various embodiments, the modular switch chassis 200 could comprise a switch, e.g., a Top-of-Rack (ToR) switch, a leaf switch, a VTEP, a virtual switch or router, a router, an edge device, etc.

The particular modular switch chassis illustrated in FIG. 2 includes five fabric card modules 202 (shown as Fabric Module 202-1 through 202-5) and N line cards 204 (shown as Line Card 204-1 through 204-N), where N is any integer number. In other embodiments, the device 200 can include more or less fabric modules 202.

Each of the fabric card modules 202 and the lines cards 204 includes a network forwarding engine (NFE) (shown as network forwarding engines 206 within the fabric card modules 202 and shown as network forwarding engines 208 within the line cards 204) that performs packet lookup, processing and forwarding functions. Each of the line cards 204 is connected to each of the fabric card modules 202. The fabric card modules 202 function to provide high-speed data forwarding connectivity for the line cards 204 within the modular switch chassis 200.

Functionality of the programming logic 112 may be considered to be distributed over various elements of the network element 104, e.g. over the line cards 204 and the fabric card modules 202. Typically, the distributed functionality of the programming logic 112 would be implemented as a part of the NFEs on the line cards 204 and the fabric card modules 202. Therefore, in the following description, references to a line card, a fabric module, or a respective NFE performing a certain method step is to be understood as performed by the programming logic 112 (or a corresponding distributed part thereof).

Typically, the network forwarding engines use memory known as a Unified Forwarding Table (UFT) to store Layer-2 and Layer-3 forwarding information. The UFT can be flexibly partitioned into three forwarding tables, the MAC Address Table, the IP Host Table and the longest prefix match (LPM) Table. This programmable memory sharing approach provides flexibility to cater to different deployment scenarios and increases the efficiency of the memory resource utilization. To maximize the system-wide forwarding scalability, the modular switch chassis is designed to use the UFT tables on line cards and fabric modules for different forwarding lookup functions. The UFT on line cards stores the L2 MAC table and the L3 Host table. Therefore line cards are responsible for L2 switching lookup and L3 host routing lookup. The UFT on the fabric modules host L3 LPM table, and perform L3 LPM routing lookup. Both line cards and fabric modules have multicast tables and take part in distributed multicast lookup and packet replication. Multicast shares the same table resource with L3 Host entries on line cards.

In a traditional routing platform, multicast entries are programmed symmetrically across all forwarding instances. For instance, if traffic is coming in only on Line Card 1 (e.g. the source 102 described in association with FIG. 1 is connected to Line Card 1) and the traffic needs to go out only on Line Card 2 because only certain ports on Line Card 2 having receivers joined to them (e.g. the receivers A and B described in the example of FIG. 1 are both connected to Line Card 2), the remaining line cards will still be programmed with the same routing entries as Line Card 2. For line cards with a limited amount of entries, it is desirable to optimize the number of entries that are programmed on the line cards to increase the scalability of the modular switch chassis. Also, depending on the Layer-2 or Layer-3 capabilities of the network, typically only Layer-2 (or only Layer-3) routes are programmed on the various modules, further limiting the scalability.

In accordance with one or more embodiments described herein, the programming logic 112 programs both Layer 2 (data link layer) and Layer 3 (network layer) routes to increase the scalability of the modular switch chassis. To that end, the programming logic 112 may be implemented as a part of the network forwarding engines (NFEs) 208 and/or NFEs 206, distributed between NFEs 208 and 206, or be configured to control these NFEs.

Layer 2 routing entries are often programmed using MAC addresses, and Layer 3 routing entries are often programmed using network addresses such as an IP address. In a modular switch chassis, due to the fact that the packets undergo lookup at both the line card module and the fabric card module, multicast entries are optimized by programming them using a hierarchical routing model. In the hierarchical routing model, multicast frames that come in on a single forwarding-engine and that need to get out on a different forwarding engine of the same or different line card are sent towards the backplane fabric modules. By performing an additional Layer 2 lookup on the fabric modules, the routing capabilities of the modular switch chassis are able to be scaled to much higher numbers with effective intra-switch bandwidth utilization.

Figure 3:
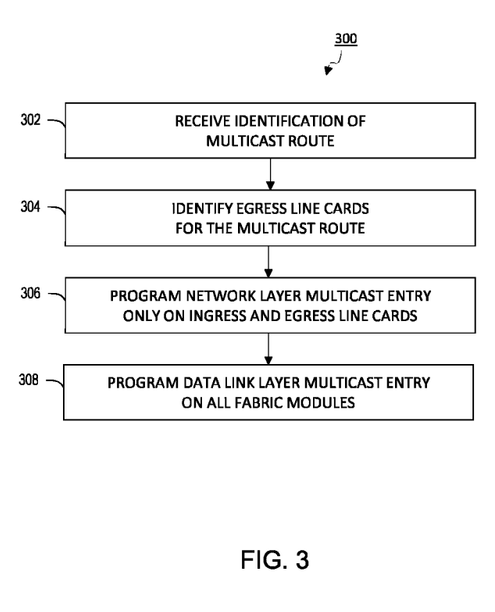
FIG. 3 is a flowchart of a method illustrating asymmetric programming of multicast entries, according to some exemplary embodiments of the present disclosure.

FIG. 3 is a flowchart of a method 300 illustrating asymmetric programming of multicast entries, according to some exemplary embodiments of the present disclosure. The method 300 may begin with a step 302, where the programming logic 112 receives an identification of a multicast route. Such a notification could be e.g. in a form of receiving a multicast packet at an ingress line card (i.e. receiving a packet via an ingress port associated with a particular line card, which implies that the packet is received from a multicast source), in which case the programming logic 112 may be included in the NFE on the ingress line card.

The multicast packet can be sent by an interface, such as a network interface on a server, for example. The multicast packet can include a multicast route, which can represent one or more destination addresses of the receivers. The received multicast packet can be an IP Multimedia Communications (IPMC) packet. The IPMC packet can represent one of Voice over IP (VOIP), video conferencing (VC), instant messaging (IM), whiteboarding, application sharing or other communication packet. Other types of packets, applications, or implementations are also contemplated herein.

In various embodiments, a packet in the multicast communication can be a packet in any private, public, physical, or virtual network. For example, the packet can traverse a multicast in a layer 2 (L2) network, a virtual local area network (VLAN), and/or an overlay network, such as a virtual extensible local area network (VXLAN), an NVGRE, an STT, etc.

The programming logic 112 then identifies one or more egress line cards for the multicast packet received in step 302, which is shown with step 304 in FIG. 3. To that end, the ingress card performs a first lookup to resolve local receivers (i.e. to identify whether the ingress line card that received the multicast packet in step 302 has receivers connected to it). For the example described above, where the source 102 described in association with FIG. 1 is connected to Line Card 1 and the receivers A and B described in the example of FIG. 1 are the receivers in the multicast group for the identified multicast route and both of them are connected to Line Card 2, then the ingress line card is Line Card 1 and the egress line card is Line Card 2. In other embodiments, the ingress line card can also be the egress line card or one of the egress line cards.

In step 306, the programming logic 112 (e.g. still the NFE of the ingress line card) programs a network layer multicast entry, e.g. IP address, for the identified multicast route in a routing table of each of the ingress and egress line cards, if such entries do not already exist on these line cards. Continuing with the example described above, such an entry would be programmed on Line Cards 1 and 2 but not on the line card to which e.g. Receiver C is connected if Receiver C is connected to one of the other line cards. Thus, the remaining line cards will not be programmed with the same routing entries as Line Cards 1 and 2.

In an embodiment, a network layer multicast entry may be keyed on the VRF, group IP address and optionally a source IP address and outputs an Outgoing Interface List (OIF List) index. The OIF List contains the list of interfaces and rewrite information for the packet. For example, a format may be as follows: [<1, 225.1.1.1, 10.10.10.10>, 5], where "1" is the VRF, "225.1.1.1" is the group IP address, "10.10.10.10" is the source IP address which is key to the multicast entry, and "5" is the Outgoing Interface List index. In another example, a format may be as follows: [<1, 226.1.1.1>, 10], where "1" is the VRF, "226.1.1.1" is the group IP address which is the key to the multicast entry, and "10" is the Outgoing Interface List index.

The programming logic 112 also programs a corresponding data link layer multicast entry, e.g. MAC address, in routing tables of the fabric modules (step 308), e.g. on all fabric modules of the modular switch chassis or at least on all fabric modules associated with or controlling the line card that received the multicast packet in step 302. In an embodiment, the corresponding data link layer multicast entry is programmed on the relevant (possibly all) fabric modules after the ingress line card provided a notification regarding creation of a new network layer multicast entry to these fabric modules.

In an embodiment, a data link layer multicast entry is keyed on a VLAN and the Multicast MAC address and outputs an Outgoing Interface List (OIF List) index. The OIF List contains the list of interfaces and rewrite information for the packet. For example, a format may be as follows: [<10, 0100.5e01.0101>, 15], where "10" is the VLAN number, "0100.5e01.0101" is the Multicast MAC address which is the key to the L2 multicast entry, and "15" is the Outgoing Interface List index.

Programming a data link layer multicast entry on a fabric module enables the fabric module to perform, in response to receiving a multicast packet, a lookup of ports and line card mappings which define which multicast groups, entries, or addresses are associated with line cards or ports in the network element. This way, the fabric module can identify the egress line cards or ports for a specific multicast route, and forward the multicast to the egress line cards or ports identified, to be subsequently forwarded to the appropriate interfaces associated with the multicast route. The fabric module can thus perform a lookup in the backplane to ensure that a multicast packet is forwarded to the appropriate line cards in the network element. The appropriate line cards can include a single egress line card, or multiple line cards, depending on the configuration and specific multicast route.

In an embodiment, steps of the method 300 may be implemented as follows. When a line card receives a multicast packet (step 302), it identifies the egress line cards (304) and creates a network layer multicast entry in its routing table or OIF list as well as in those of the egress line cards (step 306). The ingress line card then also replicate the entry to the fabric module(s) to notify the fabric module(s) that such entry is associated with that particular line card, except that the fabric module(s) are programmed with a data link layer entry corresponding to the network layer multicast entry. The fabric module(s) in the backplane can thus ensure that lookups are also performed in the backplane and multicast packets are forwarded to the correct line card(s) associated with the specific multicast packet.

Figure 4:
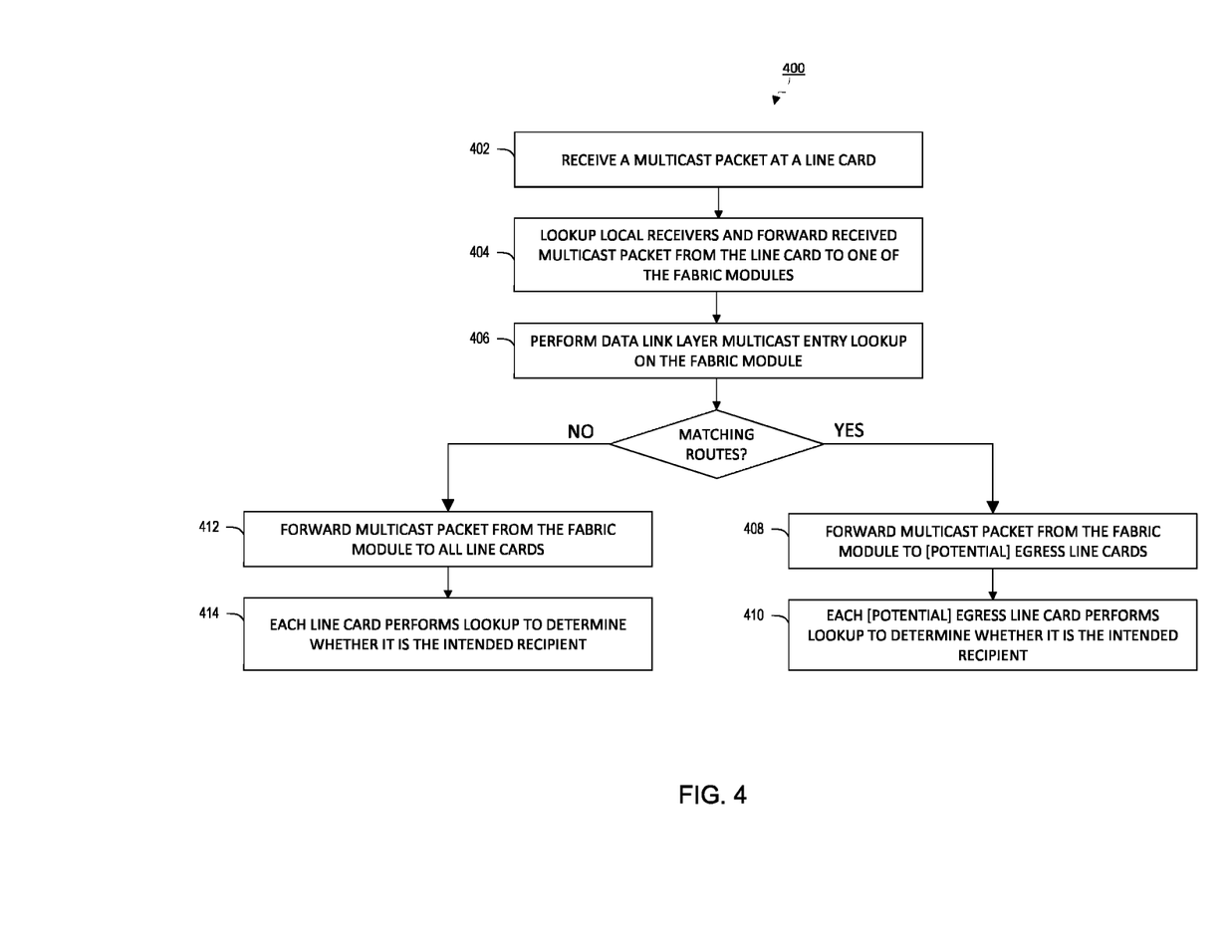
FIG. 4 is a flowchart of a method illustrating use of asymmetric programming of multicast entries, according to some exemplary embodiments of the present disclosure.

FIG. 4 is a flowchart of a method 400 illustrating the use of asymmetric programming of multicast entries, according to some exemplary embodiments of the present disclosure. The method 400 may begin with step 402, where a multicast packet is received at a line card (i.e. the programming logic 112, in this case e.g. the NFE of the ingress line card detects that a packet is received). The ingress line card then performs a multicast lookup of the entry (e.g. the entry programmed in step 306 described above) for the multicast route programmed for the received multicast packet to determine intended receivers and forwards the packet (i.e., sends a copy of the incoming packet) to one or more of the fabric module(s) (step 404). The lookup of step 404 may be considered as the "first stage" lookup of the hierarchical 3-stage lookups. The first lookup is performed in order to forward the packet to any multicast receivers that are locally attached to the ingress line card and send 1 copy of the incoming unmodified packet up to any one of the fabric modules for further processing.

On receiving the packet from a line card, the fabric module performs data link layer multicast entry lookup to determine to which line card the packet should be forwarded to (i.e., the fabric module looks up whether there is a data link layer entry for the multicast route of the received packet, e.g. the entry programmed in step 308 described above). The lookup of step 406 may be considered as the "second stage" lookup of the hierarchical 3-stage lookups.

If the lookup of step 406 yields a matching route (i.e. there is a data link layer entry at the fabric module for the multicast route of the packet received), then the method proceeds to step 408 where the fabric module forwards the received multicast packet to all potential egress cards as identified by the data link layer entry. The term "potential" is used in this context to indicate that, in some embodiments, the egress cards identified at step 408 could not only include the actual line cards to which intended receivers of the multicast packet are connected to, but also their aliases in view of multicast aliasing.

As is known, multicast aliasing (or MAC address aliasing) refers to associating more than one IP address to the same MAC address. In context of the present disclosure, aliasing refers to a single Layer 2 route (i.e. the route programmed in step 308 on the fabric module(s)) being associated with two or more different line cards. In other words, when a multicast IP address, programmed on the line cards in step 306, is converted to a multicast MAC address, programmed on the fabric modules in step 308, there is an aliasing effect where a number of IP addresses (e.g. up to 32 IP addresses) can map to the same MAC address.

In step 410, each line card that received the packet forwarded by the fabric module performs a multicast table entry lookup to determine whether it is the intended recipient. To that end, each line card determines whether it is programmed with a network layer entry for the multicast route for the packet received from the fabric module. Because of the asymmetric programming, only the actual egress line cards are programmed with such entries. Therefore, if a line card determines that it is programmed with a corresponding entry for the packet, then it may forward the packet to the receivers via it's egress ports, and otherwise the line card may be configured to ignore/drop the packet (i.e. the line card is not the intended recipient because it was not programmed with the corresponding route). The lookup performed by the line cards in steps 410 may be considered to be the "third stage" lookup of the hierarchical 3-stage lookups.

If the lookup at the fabric module (step 406) does not yield a matching route (i.e. there is no data link layer entry at the fabric module for the multicast route of the packet received), then the method may proceed to step 412 where the fabric module forwards the received multicast packet to all line cards, a process typically referred to as "flooding." Then it becomes up to the line cards to determine whether they are the intended recipients. Thus, in step 414, each line card that received the packet forwarded by the fabric module performs a multicast table entry lookup to determine whether it is the intended recipient, analogous to step 410 described above.

The asymmetric programming of the network layer multicast entries on the line cards (i.e. only programming the L3 tables of the ingress and egress line cards) provides an advantage of reduced programming on the line cards. Programming data link layer multicast entries on the fabric modules is an optional feature, providing an additional benefit of enabling the fabric module to perform a successful lookup of the L2 table and only forward the multicast packet to the potential aggress cards. Thus, even when aliasing is present, the intra-chassis bandwidth is saved compared with the flooding scenario because multicast packets are not forwarded from a fabric module to all line cards (as in flooding) but only to a subset of line cards.

In accordance with various embodiments, by programming Layer 3 multicast entries asymmetrically on forwarding instances of line card modules, programming Layer 2 multicast entries symmetrically in fabric card modules, and ensuring that a hierarchical lookup is performed on all multicast frames, the number of multicast route entries may be scaled to much larger values. This increase in scale takes place with limited increase to the intra-switch bandwidth.

One or more embodiments described herein may provide an advantage of increasing the routing table size of a node to values larger than the forwarding instance size of a single chip. This benefit may come at minimal increase to intra-switch bandwidth by making use of the Layer 2 to Layer 3 aliasing properties.

Figure 5:
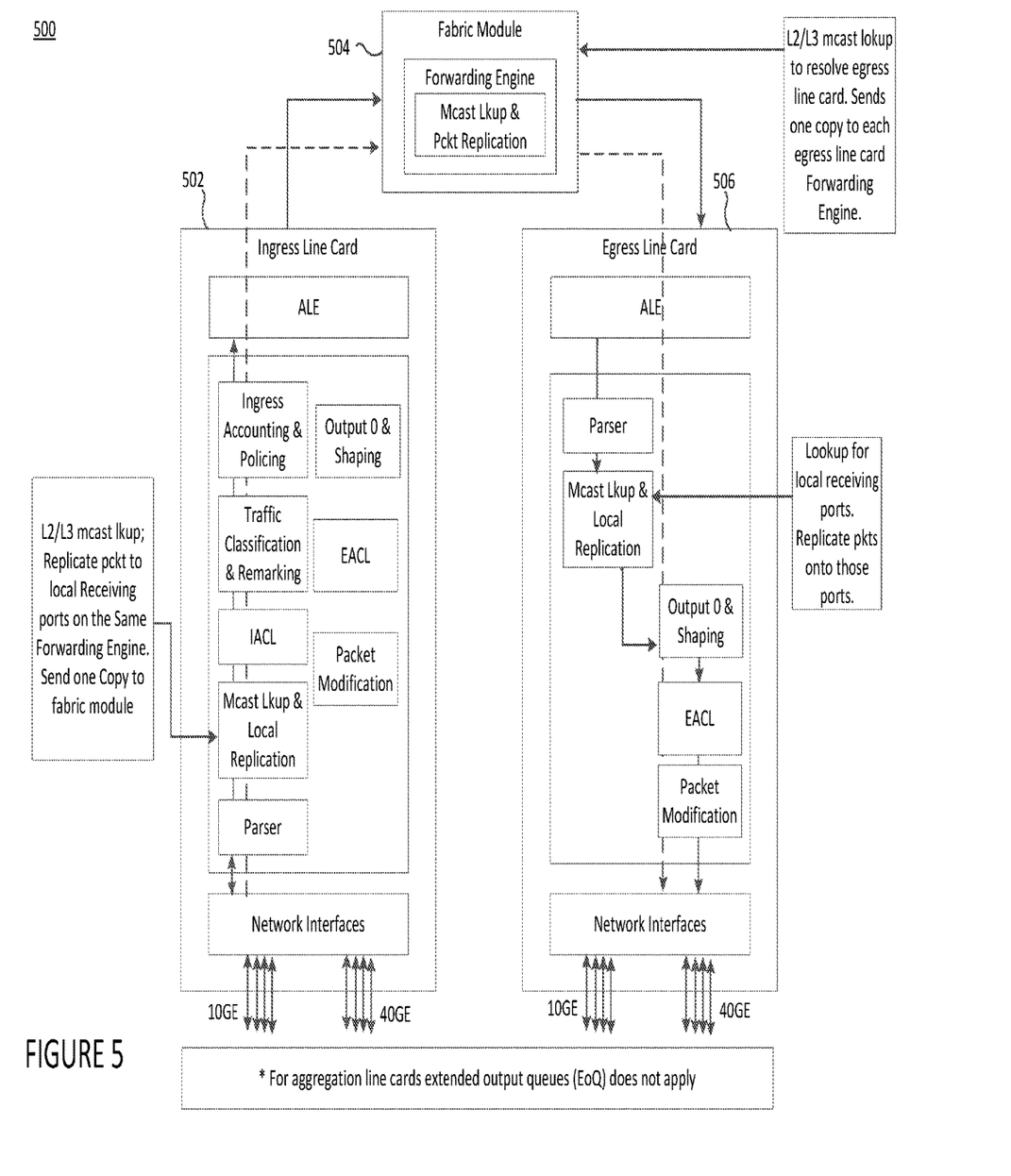
FIG. 5 illustrates multicast packet forwarding in a modular switch chassis, according to some exemplary embodiments of the present disclosure.

FIG. 5 illustrates multicast packet forwarding in a modular switch chassis 500, according to some exemplary embodiments of the present disclosure. The example of FIG. 5 illustrates a Nexus 9500 switch configured to perform 3-stage distributed multicast lookup and replication, as described above. The multicast routing table is stored on all line cards and fabric modules. The ingress NFE performs the 1st lookup to resolve local receivers (i.e., steps 302 and 304, described above). If there are any local receivers, the NFE creates one copy per local receiving port (i.e., step 306 described above). Also, the ingress NFE sends a copy of the incoming packet to the fabric module. On receiving the packet, the fabric module performs the 2nd lookup to find the egress line cards (i.e., step 406 described above). The fabric module replicates the packet to each egress NFE (i.e., step 408 described above). The egress NFE performs the 3rd lookup to resolve its local receivers and replicates the packet onto those ports (i.e., step 410 described above). This multi-stage multicast lookup and replication provides an efficient way of replicating and forwarding multicast traffic.

In the example illustrated in FIG. 5, a single ingress line card 502, fabric card module 504, and egress line card 506 is illustrated. In an example multicast packet forwarding flow, a packet is received by the ingress line card 502, a multicast table lookup is performed (i.e., the 1st lookup), and the packet is copied to the fabric card module 504. The fabric card module 504 then performs a multicast table lookup (i.e., the 2nd lookup) to resolve the egress line card 506 and sends a copy of the packet to each egress line card (and possibly to its aliases). Upon the egress line card 506 receiving the packet, the egress line card performs a lookup (i.e., the 3d lookup) for local reports and replicates the packet onto those ports.

Programming Flows

One technique for programming multicast routing table is through the use of (S,G) routes (where "S" denotes a multicast source, and "G" denotes a multicast group comprising one or more multicast receivers). (S,G) routes flow from a source to a group based on the IP address of the multicast source and the IP address of the multicast group destination. In accordance with various embodiments, Layer 3 (S,G) routes are programmed only when required on a particular line card module in order to optimize on the use of L3 tables on the line cards (i.e. only on ingress and egress line cards). For each Layer 3 (S,G) route that is programmed in the line card, a Layer 2 (vlan, Gmac) route is programmed in the fabric card module. In particular embodiments, Layer 2 muticast MAC address are 48 bits in size, and Layer 3 mulitcast addreses are 32 bits in size. Accordingly, a Layer 3 entry in a line card may aliase into a larger Layer 2 entry in the fabric card module. Since the Layer 2 route aliases a number of Layer 3 routes, it enables the ablity to scale the number of routes in the system with optimal bandwidth utilization. In order to scale the number of entries in the fabric card module, a (vlan-*, gmac) entry is programmed, where "vlan-*" denotes VLAN of the incoming packet and "gmac" denotes an L2 multicast MAC address in the packet.

In accordance with various embodiments, a catch-all entry may also be programmed on the fabric card to flood to all line cards. The catch all entry can be the last forwarding entry in the lookup pipeline, or can also be achieved via a Access Control List (ACL). Such a catch-all entry can ensure that no traffic will be dropped by the fabric module.

By using the Layer 3 to Layer 2 aliasing properties with multicast addresses, scaling to larger table sizes than the size of a single forwarding engine is enabled, with minimal increase of intra-switch bandwidth.

For example, in a modular switch chassis having eight line cards, assume that data traffic comes in on Line Card 1, and Line Card 4 and Line Card 5 are the only ones that need programming (i.e. only Line Cards 4 and 5 have receivers for the multicast traffic attached to them). In such an example, Line Card 1 may have an SG entry indicating Line Card 4 and Line Card 5 as egress line cards, which entry would be copied to Line Cards 4 and 5 as well, thus programming those line cards. For Line Cards 2, 3, 6, 7, 8 no additional entries are required and remain available for future programming.

In an example packet flow, a packet is received by an ingress line card and a Layer 3 lookup is performed on the line card. The ingress line card copies the packet to the fabric card module which performs a Layer 2 lookup to determine one or more egress line cards to which to copy the packet. Since the Layer 3 multicast address is aliased with the Layer 2 multicast address, the aliased routing table entry may cause the fabric card module to potentailly send copies of the packet to more egress line cards than is necesary. A particular egress line card, upon receiving the packet from the fabric card module, determines whether the particular packet is intended for the egress line card. If the packet is not intended for the particular egress line card, the egress line card will drop the packet. If the packet is intended for the particular egress line card, the egress line card sends the packet out on an outbound port.

Exemplary Data Processing system

FIG. 6 depicts a block diagram illustrating an exemplary data processing system 600 that may be used in a network element as described with reference to FIG. 1, according to one embodiment of the present disclosure. The data processing system 600 may e.g. be used in/as the programming logic 112 illustrated in FIG. 1.

As shown in FIG. 6, the data processing system 600 may include at least one processor 602 coupled to memory elements 604 through a system bus 606. As such, the data processing system may store program code within memory elements 604. Further, the processor 602 may execute the program code accessed from the memory elements 604 via a system bus 606. In one aspect, the data processing system may be implemented as a computer that is suitable for storing and/or executing program code. It should be appreciated, however, that the data processing system 600 may be implemented in the form of any system including a processor and a memory that is capable of performing the functions described within this specification.

The memory elements 604 may include one or more physical memory devices such as, for example, local memory 608 and one or more bulk storage devices 610. The local memory may refer to random access memory or other non-persistent memory device(s) generally used during actual execution of the program code. A bulk storage device may be implemented as a hard drive or other persistent data storage device. The processing system 600 may also include one or more cache memories (not shown) that provide temporary storage of at least some program code in order to reduce the number of times program code must be retrieved from the bulk storage device 610 during execution.

Input/output (I/O) devices depicted as an input device 612 and an output device 614 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 6 with a dashed line surrounding the input device 612 and the output device 614). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 616 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 600, and a data transmitter for transmitting data from the data processing system 600 to said systems, devices and/or networks. Modems, cable modems, and Ethernet cards are examples of different types of network adapter that may be used with the data processing system 600.

As pictured in FIG. 6, the memory elements 604 may store an application 618. In various embodiments, the application 618 may be stored in the local memory 608, the one or more bulk storage devices 610, or apart from the local memory and the bulk storage devices. It should be appreciated that the data processing system 600 may further execute an operating system (not shown in FIG. 6) that can facilitate execution of the application 618. The application 618, being implemented in the form of executable program code, can be executed by the data processing system 600, e.g., by the processor 602. Responsive to executing the application, the data processing system 600 may be configured to perform one or more operations or method steps described herein.

Persons skilled in the art will recognize that while the elements 602-618 are shown in FIG. 6 as separate elements, in other embodiments their functionality could be implemented in lesser number of individual elements or distributed over a larger number of components.

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate operations thereof related to scalable handling of BGP route information in VXLAN with EVPN control plane. This may be inclusive of appropriate algorithms and communication protocols that allow for the effective exchange of data or information.

In one implementation, line cards and fabric modules, or the NFEs therein, described herein may include software to achieve (or to foster) the functions discussed herein for asymmetric programming of multicast routing entries and hierarchical lookup, where the software is executed on one or more processors to carry out the functions. This could include the implementation of instances of programming logic and/or any other suitable element that would foster the activities discussed herein. Additionally, each of the line cards and fabric modules, or the NFEs therein, may have an internal structure (e.g., a processor, a memory element, etc.) to facilitate some of the operations described herein. In other embodiments, these functions for asymmetric programming of multicast routing entries and hierarchical lookup may be executed externally to the line cards and fabric modules, or the NFEs therein, or included in some other network element to achieve the intended functionality. Alternatively, line cards and fabric modules, or the NFEs therein, may include software (or reciprocating software) that can coordinate with other network elements in order to achieve the functions related to asymmetric programming of multicast routing entries and hierarchical lookup described herein. In still other embodiments, one or several devices may include any suitable algorithms, hardware, software, components, modules, interfaces, or objects that facilitate the operations thereof.

In certain example implementations, functions related to asymmetric programming of multicast routing entries and hierarchical lookup outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to enable functions disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in asymmetric programming of multicast routing entries and hierarchical lookup, as outlined herein. Additionally, each of these devices may include a processor that can execute software or an algorithm to perform asymmetric programming of multicast routing entries and hierarchical lookup as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of asymmetric programming of multicast routing entries and hierarchical lookup, as potentially applied to a myriad of other architectures.

It is also important to note that the steps in the FIGS. 3 and 4 illustrate only some of the possible scenarios that may be executed by, or within, the line cards and fabric modules, or the NFEs therein, described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the line cards and fabric modules, or the NFEs therein, in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A method comprising:
   determining, at a fabric module, whether there is a data link layer entry for a multicast route of a multicast packet,
   in response to determining there is a data link layer entry for a multicast route of a multicast packet, forwarding, by the fabric module, the multicast packet to all potential egress cards as identified by the data link layer entry;
   determining, by one of the egress cards that received the multicast packet from the fabric module, whether the one of the egress cards is an intended recipient of the multicast packet; and
   in response determining the one of the egress cards is an intended recipient of the multicast packet, forwarding the multicast packet to an egress port of the one of the egress cards.

2. The method of claim 1, wherein the determining the one of the egress cards is an intended recipient of the multicast packet is performed by all of the egress cards that received the forwarded multicast packet.

3. The method according to claim 1, further comprising discarding the packet in response to determining the one of the egress cards is not an intended recipient of the multicast packet.

4. The method according to claim 1, further comprising in response to determining there is not a data link layer entry for a multicast route of a multicast packet:
   forwarding, by the fabric module, the multicast packet to all available egress line cards; and
   determining, by each of the available egress line cards that received the multicast packet from the fabric module, whether the card is the intended recipient of the multicast packet.

5. The method according to claim 4, further comprising:
   in response to determining, at any of the available egress line cards, that the card is not the intended recipient of the multicast packet, discarding the multicast packet at the any of the available egress line cards.

6. The method of claim 1, further comprising:
   prior to the determining there is a data link layer entry for a multicast route of a multicast packet:
   receiving the multicast packet at an ingress line card;
   determining, from a multicast route programmed for the multicast packet, intended receivers; and
   forwarding the multicast packet to the fabric module.

7. The method of claim 6, wherein the determining there is a data link layer entry for a multicast route of a multicast packet at the fabric module is in response to receiving the multicast packet.

8. A system, comprising:
   a plurality of ingress line cards;
   a plurality of fabric modules;
   a plurality of egress line cards;
   at least one of the fabric modules being programmed to:
   determine, at a fabric module, whether there is a data link layer entry for a multicast route of a multicast packet;
   in response to determining there is a data link layer entry for a multicast route of a multicast packet, forwarding, by the fabric module, the multicast packet to all potential egress cards as identified by the data link layer entry;
   determine, by one of the egress cards that received the multicast packet from the fabric module, whether the one of the egress cards is an intended recipient of the multicast packet; and
   in response determining the one of the egress cards is an intended recipient of the multicast packet, forward the multicast packet to an egress port of the one of the egress cards.

9. The system of claim 8, wherein the determine the one of the egress cards is an intended recipient of the multicast packet is performed by all of the egress cards that received the forwarded multicast packet.

10. The system according to claim 8, at least one of the egress cards being further programmed to discard the packet in response to determining the one of the egress cards is not an intended recipient of the multicast packet.

11. The system according to claim 8, further comprising:
forward, by the fabric module, the multicast packet to all available egress line cards; and
determine, by each of the available egress line cards that received the multicast packet from the fabric module, whether the card is the intended recipient of the multicast packet.

12. The system according to claim 11, further comprising:
in response to determining, at any of the available egress line cards, that the card is not the intended recipient of the multicast packet, discard the multicast packet at the any of the available egress line cards.

13. The system of claim 8, further comprising:
at least one ingress card being programmed to, prior to the determining there is a data link layer entry for a multicast route of a multicast packet, execute operations including:
receive the multicast packet at an ingress line card;
determine, from a multicast route programmed for the multicast packet, intended receivers; and
forward the multicast packet to the one of the fabric modules.

14. The system of claim 13, wherein the determine there is a data link layer entry for a multicast route of a multicast packet at the fabric module is in response to receiving the multicast packet.

15. At least one non-transitory computer readable storage media storing instructions for a telecommunications network, the network including a plurality of ingress line cards, a plurality of fabric modules, and a plurality of egress line cards, the instructions being programmed to cause the network to perform operations comprising:
first determine, at a fabric module, whether there is a data link layer entry for a multicast route of a multicast packet;
in response to determining there is a data link layer entry for a multicast route of a multicast packet, forwarding, by the fabric module, the multicast packet to all potential egress cards as identified by the data link layer entry;
second determine, by one of the egress cards that received the multicast packet from the fabric module, whether the one of the egress cards is an intended recipient of the multicast packet; and
in response determining the one of the egress cards is an intended recipient of the multicast packet, forward the multicast packet to an egress port of the one of the egress cards.

16. The at least one non-transitory computer readable storage media of claim 15, wherein the determine the one of the egress cards is an intended recipient of the multicast packet is performed by all of the egress cards that received the forwarded multicast packet.

17. The at least one non-transitory computer readable storage media according to claim 15, the operations further comprising discard the packet in response to determining the one of the egress cards is not an intended recipient of the multicast packet.

18. The at least one non-transitory computer readable storage media according to claim 15, the operations further comprising in response to a negative result of the first determine:
forward, by the fabric module, the multicast packet to all available egress line cards; and
determine, by each of the available egress line cards that received the multicast packet from the fabric module, whether the card is the intended recipient of the multicast packet.

19. The at least one non-transitory computer readable storage media according to claim 18, the operations further comprising:
in response to determining, at any of the available egress line cards, that the card is not the intended recipient of the multicast packet, discard the multicast packet at the any of the available egress line cards.

20. The at least one non-transitory computer readable storage media of claim 15, the operations further comprising:
prior to determining there is a data link layer entry for a multicast route of a multicast packet;
receive the multicast packet at an ingress line card;
determine, from a multicast route programmed for the multicast packet, intended receivers; and
forward the multicast packet to the fabric module.

* * * * *